(12) United States Patent
Tapp et al.

(10) Patent No.: US 6,760,374 B1
(45) Date of Patent: Jul. 6, 2004

(54) BLOCK DECISION FEEDBACK EQUALIZATION METHOD AND APPARATUS

(75) Inventors: Thomas L. Tapp, Cedar Rapids, IA (US); Joseph T. Graf, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 651 days.

(21) Appl. No.: 09/665,509

(22) Filed: Sep. 19, 2000

(51) Int. Cl.$^7$ ............................................. H04H 7/30
(52) U.S. Cl. .................................... 375/233; 375/350
(58) Field of Search ................................ 375/350, 233, 375/232, 224, 230, 316; 708/323

(56) References Cited

U.S. PATENT DOCUMENTS

| | | | |
|---|---|---|---|
| 4,365,338 A | 12/1982 | McRae et al. ................ | 375/12 |
| 5,436,929 A | 7/1995 | Kaleh ........................ | 375/233 |
| 5,630,154 A | * 5/1997 | Bolstad et al. ............... | 712/19 |
| 5,790,598 A | 8/1998 | Moreland et al. ............. | 34/233 |
| 6,061,396 A | * 5/2000 | Everitt ....................... | 375/233 |

OTHER PUBLICATIONS

Liu, Zheng–She, QR Methods of O(N) Complexity in Adaptive Parameter Estimation, Mar. 1995, IEE Transaction on Signal Processing, vol. 43, No. 3, pp 720–729.*

F.M. Hsu, "Data Directed Estimation Techniques For Single–Tone HF Modems," IEEE MILCOM, 12.4.1–12.4.10, 1985.

G.K. Kaleh, "Channel Equalization for Block Transmission Systems," IEEE Journal on Selected Areas in Communications, vol. 13, No. 1, pp. 110–121, 1995.

S. N. Crozier, D. D. Falconer and S. A. Mahmoud, "Reduced Complexity Short–Block Data Detection Techniques for Fading Time–Dispersive Channels," IEEE Transactions on Vehicular Technology, vol. 41, No. 3, pp. 255–265, Aug. 1992.

Co–pending patent application Ser. No. 09/666,245, entitled "Block Decision Equalization Method and Apparatus" filed on an even date, inventor J. Graf et al.

* cited by examiner

*Primary Examiner*—Don N. Vo
(74) *Attorney, Agent, or Firm*—Nathan O. Jensen; Kyle Eppele

(57) ABSTRACT

A method and apparatus for receiving data over a dispersive media is disclosed. The received signal is composed of an unknown data segment preceded and followed by known data segments. The communication apparatus generates a replica of the known data segments. Channel characteristics existing at the time of transmission of the known data segments are estimated by comparing the known data segments with the replica. The symbols of the unknown data segment are then determined via application of a QR factorization. Factorization can be accomplished via Householder transformation, Givens rotation or fast Givens rotation. Decisions can be made on the various unknown symbols as they are analyzed and then fed back via back substitution.

43 Claims, 6 Drawing Sheets

$$\begin{bmatrix} f_1^0 & 0 & 0 & 0 & g_1^0 & 0 & 0 & 0 \\ f_0^0 & f_1^1 & 0 & 0 & g_0^0 & g_1^1 & 0 & 0 \\ 0 & f_0^1 & f_1^2 & 0 & 0 & g_0^1 & g_1^2 & 0 \\ 0 & 0 & f_0^2 & f_1^3 & 0 & 0 & g_0^2 & g_1^3 \\ 0 & 0 & 0 & f_0^3 & 0 & 0 & 0 & g_0^3 \end{bmatrix} \begin{bmatrix} A_3 \\ b_0 \\ b_1 \\ b_2 \\ A_4 \end{bmatrix} = \begin{bmatrix} r_0 \\ r_1 \\ r_2 \\ r_3 \\ r_{0.5} \\ r_{1.5} \\ r_{2.5} \\ r_{3.5} \end{bmatrix}$$

Fig. 10

BLOCK DECISION FEEDBACK EQUALIZATION METHOD AND APPARATUS

CROSS REFERENCE TO RELATED APPLICATIONS

Cross-reference is made to a related U.S. patent application by Joseph T. Graf and Thomas L. Tapp, filed on even date herewith, and entitled "Block Decision Directed Equalization Method and Apparatus."

FIELD OF THE INVENTION

The present invention generally relates to an improved data communication system and technique, more particularly relates to an improved equalization scheme for a digital communication system, and even more particularly relates to the block decision feedback equalization of signals transmitted via a dynamic dispersive media.

BACKGROUND OF THE INVENTION

Equalization is a technique often used in wireless communication applications. For example, when digital data is transmitted over a dispersive communication channel, an equalizer can be used to improve the estimate of the originally transmitted symbols. More particularly, equalizers are becoming increasingly important in high frequency (HF) radio communication applications. Such applications are requiring increasingly higher data rates in a fixed bandwidth; i.e. increased bandwidth efficiency. For example, many current applications require performance sufficient to meet the specifications for a 64-QAM (quadrature-amplitude modulation) signal.

As bandwidth efficiency is increased, however, information reliability is typically reduced. The reduction in reliability results, at least in part, from various channel effects. Equalization techniques can be used to mitigate many of the various channel effects. Use of an equalization technique can thereby make the communication system more reliable.

Several different channel effects can cause a reduction in reliability. A description of some of the various channel effects follows. Constrained channel bandwidth, for example, can cause time dispersion and intersymbol interference (ISI). Thermal noise and interference can lower the signal-to-noise ratio and thereby impact performance. Multipath interference can cause fading and time dispersion. Fading can also result from the physical characteristics of the communication channel being used. Delay and Doppler shift, which also result from the physical characteristics of the communication channel being used, can cause, respectively, time and frequency shifts.

Transmitter and receiver characteristics, which also affect the signal, must be accounted for as well. For example, the transmitter can include transmit filters and automatic level control (ALC). Likewise, the receiver can include receive filters and automatic gain control (AGC). These system influences should be addressed since they are also included in the channel response of any real system.

Figure 1:
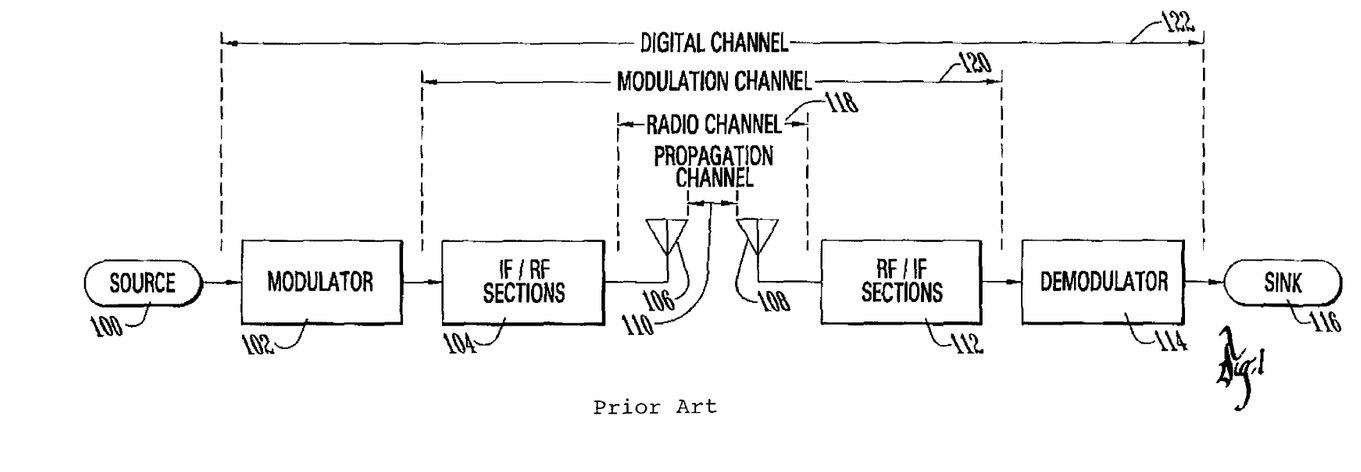
FIG. 1 is a block diagram of the basic structure of a wireless communication system.

The equalizer's role is to compensate for such effects. FIG. 1 depicts a block diagram of a basic communication system. Data from a source 100 is fed to a modulator 102 that in turn passes the modulated data to a wireless communication component 104. The communication signal is then transmitted by a transmitter antenna 106 to a receiver antenna 108. The link between the two antennas 106, 108 is known as the propagation channel 110. The receiver antenna 108 passes the received signal to the receiver's wireless communication component 112 that in turn sends the signal to a receiver-based demodulator 114. The demodulated signal is then sent for further processing, handling or storage as represented by sink 116.

The channel between the two wireless communication components 104, 112 is known as the radio channel 118. The channel between the modulator 102 and the demodulator 114 is known as the modulation channel 120. The channel between the source 100 and the sink 116 is known as the digital channel 122. The equalizer typically compensates for the influences found across the modulation channel 120. Thus, when used for such a purpose, it can be used to compensate for the channel and system effects described above.

Figure 2:
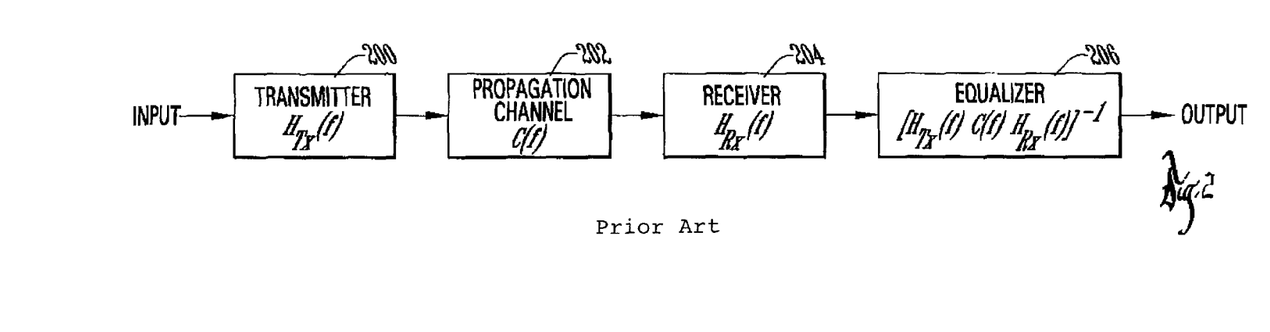
FIG. 2 is a block diagram depicting the some of the basic components of a wireless communication system and the filtering effects associated with those components.

FIG. 2 depicts a use of an equalizer as a filter compensating for the effects influencing the modulation channel. The effects of the transmitter 200 can be represented as $H_{Tx}(f)$. The effects of the propagation channel 202 can be represented as $C(f)$. The effects of the receiver 204 can be represented as $H_{Rx}(f)$. For example, the ideal response of a linear equalizer 206 can be represented as a filter that mitigates the effects of the modulation channel by having a response such as $[H_{Tx}(f)C(f)H_{Rx}(f)]^{-1}$.

Typical equalizer implementations require knowledge of the characteristics of the communication channel. Several different techniques have been used to estimate or model these characteristics. For example, the initial channel characteristics can be estimated using a training sequence. The estimate can then be updated using a least-mean squares (LMS) algorithm or a recursive-least squares (RLS) algorithm. Another technique employs periodically inserted correlator probes, which are used to guide the channel updates. Further, use of a carefully designed probe can enable an efficient estimation of the channel characteristics. One example of such a probe is provided in the MIL-STD-188-110B Appendix C standard, wherein a simple correlator can be used to obtain the channel estimate.

Figure 3:
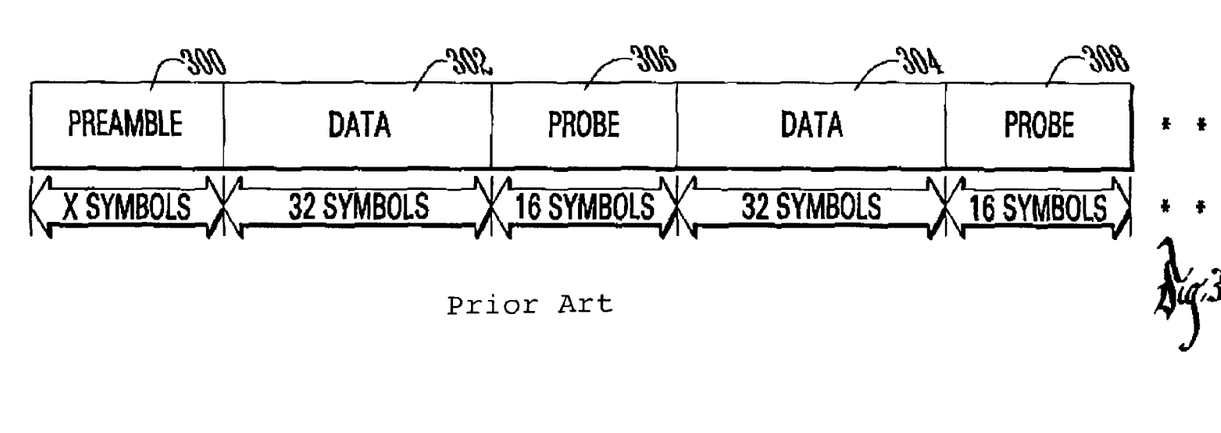
FIG. 3 depicts a waveform having unknown data segments separated by known data segments.

An example of a typical signaling sequence is depicted in FIG. 3. An initial preamble 300 of "x" symbols is used for acquisition and synchronization. In this example, the data packets 302, 304 each include thirty-two unknown symbols. The probes 306, 308 each include a sequence of sixteen known symbols. Alternatively, different numbers of symbols can be communicated in the unknown data segments 302, 304 and probes 306, 308. For example, in the more recently developed MIL-STD-188-110B Appendix C standard, each known probe segment includes thirty-one known symbols and each unknown data segment 302, 304 includes 256 unknown symbols. Each "unknown" data segment 302, 304 is thus encapsulated between two "known" probe packets 300, 306, 308. Various modulation techniques, such as phase-shift keying (PSK), quadrature amplitude modulation (QAM) and quadrature phase-shift keying (QPSK), for example, can be used to transmit the various segments of the signaling sequence.

An example of a communication system using an encapsulated unknown data/known probe approach, such as that depicted in FIG. 3, can be found in U.S. Pat. No. 4,365,338 (Technique For High Rate Digital Transmission Over A Dynamic Dispersive Channel) to McRae et al. The technique disclosed in U.S. Pat. No. 4,365,338, however, uses a normal equations approach to solve the over-determined least-squares problem. New methods and approaches are needed for determining the symbols of the unknown data segment in environments wherein the channel characteristics can vary over the duration of the unknown data segment.

Consequently, there exists a need for equalization approaches capable of taking changing characteristics into consideration when determining symbols transmitted in an unknown data segment. These needs and others are fulfilled by the invention disclosed in the following detailed description.

SUMMARY OF THE INVENTION

It is an object of the present invention to provide an equalizer for a communication system transmitting data via a dispersive media.

It is one feature of the present invention to utilize QR factorization to solve the over-determined least-squares problem.

It is an advantage of the present invention to provide an accurate and reliable determination of the symbols of the unknown data segment even in situations wherein the channel characteristics vary over the duration of the unknown data segment.

Thus, the present invention involves an improved block equalization apparatus and method that relies on a QR factorization approach to the least-squares detection problem, rather than the normal equations.

BRIEF DESCRIPTION OF THE DRAWINGS

The invention may be more fully understood by reading the following description of the invention, in conjunction with the appended drawings wherein.

DETAILED DESCRIPTION

Figure 4:
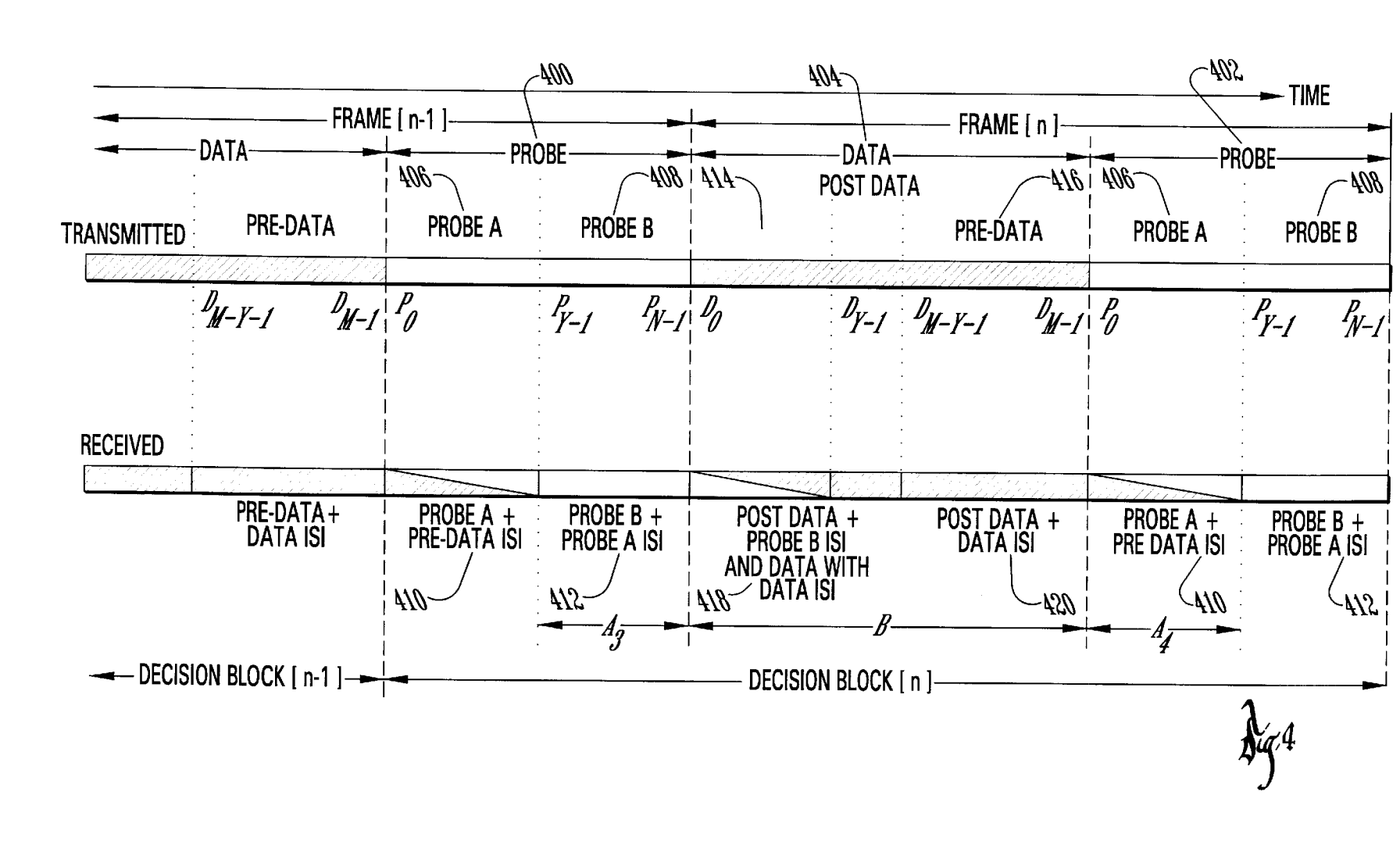
FIG. 4 depicts a more detailed view of a decision block structure having unknown data segments separated by known data segments.

FIG. 4 depicts an embodiment of a decision block structure of a type suitable for use with the present invention. Various known communication components can be used to transmit the data and other information described throughout this specification. Systems such as those outlined in FIGS. 1 and 2, for example, as well as many other known communication systems, can be used in conjunction with the present invention. Such systems typically include a transceiver component and a processing component. Also included is a memory system storing, among other things, received data, data to be transmitted and programs controlling data transmission, data reception and network operations.

The communicated sequence includes alternating blocks of known and unknown symbols such that each unknown data block or segment is both preceded and followed by a segment of symbols that is known to the receiver prior to, or at the time of, reception. For example, in FIG. 4, each known data segment 400, 402 is labeled "probe" and each unknown data segment 404 is labeled simply as "data." A known data segment 400, 402 can be a concatenation of a PROBE A 406 portion (from 0 to Y−2) with a PROBE B portion 408 (from Y−1 to N−1). The variable "Y" is related to the length of the channel impulse response such that Y+1 equals the length of the channel response. In addition, the length of the known data segment is represented as "N" and the length of the unknown data segment is "M" in FIG. 4.

The known and unknown data segments can be further subdivided. Each probe or known data segment can be subdivided into a first portion, "PROBE A" 406, and a second portion, "PROBE B" 408. Further, each PROBE A 406 portion can be subject to ISI 410 from symbols, either preamble symbols or unknown data segment symbols, being transmitted just prior to PROBE A 406. Likewise, each PROBE B 408 portion can be affected by ISI 412 from the PROBE A 406 portion. This effectively isolates the PROBE B portion of the known data segment from the channel effects of the preceding decision block (assuming the channel response is no longer than the length of PROBE A).

Each unknown data segment 404 can, for discussion purposes, also be subdivided. In FIG. 4, one portion of each unknown data segment is labeled "post-data" 414 and a second portion is labeled "pre-data" 416. Each "post-data" portion can be subject to ISI 418 from PROBE B and from other data symbols of the unknown data segment 404. Each "pre-data" portion can be subject to ISI 420 from "post-data" symbols and from other data symbols within the unknown data segment 404.

For the equalizer, the goal is to estimate the received segment of unknown data symbols, which is surrounded by known probe sequences. As is well known in the art, several different channel estimation algorithms, such as the least squares, LMS, RLS, Fast RLS, and Lattice algorithms, can be used to generate a channel estimate from a known probe segment. The channel impulse response can be modeled as a transversal filter with Y+1 taps, $$f = [f_0, f_1, \ldots, f_Y]^T,$$

where the superscript 'T' indicates (real) transposition. Except where noted, the sampling rate is the same as the baud rate.

Block equalization is based on the least-squares solution to the matrix equation $M_1 \hat{B} = C$, where matrix $M_1$ is constructed from the estimate of the channel impulse response, $\hat{B}$ is the unknown data segment to be detected, and the vector C is a function of all of the received samples affected by the unknown data vector B. As is well known in the art, several different channel estimation algorithms, such as the least squares, LMS, RLS, Fast RLS, and Lattice algorithms, can be used to generate f. In U.S. Pat. No. 4,365,338 to McRae et al., the channel estimate is considered to be fixed over the duration of the unknown data segment.

In general, using the reversed vector, $$f^r = [f_Y, f_{Y-1}, \ldots, f_0],$$

wherein Y is related to the length of the channel response such that Y+1 equals the length of the channel response, the convolution can be represented as r'=MB+n or in matrix form as:

$$r' = \begin{bmatrix} \underline{f}^T & & & 0 \\ & \underline{f}^T & & \\ & & \underline{f}^T & \\ & & & \ddots \\ 0 & & & \underline{f}^T \end{bmatrix} \begin{bmatrix} A_3 \\ B \\ A_4 \end{bmatrix} + n$$

where r' consists of all received symbols affected by the unknown data segment B, and n is a vector of additive white Gaussian noise samples. The last "Y" symbols of the preceding probe sequence form the vector $A_3$, while the first "Y" symbols of the trailing probe sequence form the vector $A_4$. These are the probe symbols that cause intersymbol interference (ISI) with symbols in the unknown data segment.

In addition, the channel estimate can vary over the duration of the unknown data block. One simple approximation to the channel impulse response within the data segment can be obtained by a linear interpolation between the channel estimates obtained by the probes at either end. Other approximations may include quadratic or cubic interpolations using the channel estimates from the probes bordering the adjacent data segments.

The convolution matrix can be partitioned as shown in the equation $r'=M_1B+M_2A_3+M_3A_4+n$, where $$M_1 = \begin{bmatrix} f_0 & & & 0 \\ f_1 & f_0 & & \\ \vdots & \vdots & \ddots & \\ f_Y & f_{Y-1} & & f_0 \\ & f_Y & & f_1 \\ & & \ddots & \vdots \\ 0 & & & f_Y \end{bmatrix}, ((M+Y) \times M)$$

$$M_2 = \begin{bmatrix} f_Y & f_{Y-1} & \cdots & f_1 \\ & f_Y & & f_2 \\ & & \ddots & \vdots \\ & & & f_Y \\ & & & \\ 0 & & & \end{bmatrix}, ((M+Y) \times Y)$$

$$M_3 = \begin{bmatrix} & & & 0 \\ & \ddots & & \\ f_0 & & & \\ f_1 & f_0 & & \\ \vdots & & \ddots & \\ f_{Y-1} & f_{Y-2} & \cdots & f_0 \end{bmatrix}, ((M+Y) \times Y).$$

The numbers in parentheses indicate the number of rows and columns of the associated matrix. Note that $M_2$ consists of the first "Y" columns of the original convolution matrix, while $M_3$ consists of the last "Y" columns. The $M_1$ matrix consists of the columns located between those columns used for the $M_2$ and $M_3$ matrices.

Figure 5:
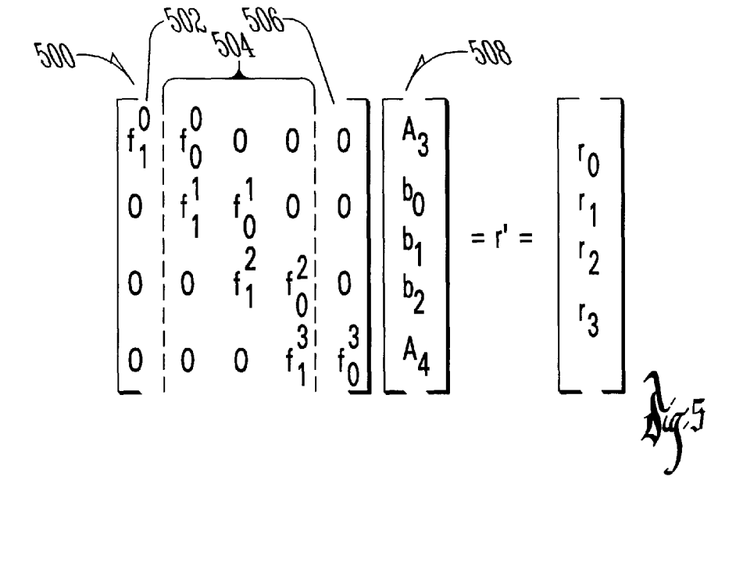
FIG. 5 depicts a convolution matrix related to an embodiment of the present invention.

FIG. 5, for example, depicts a representation of an M matrix 500 and the equation MX=r' wherein Y=1 (and therefore $\underline{f}^T=[f_1, f_0]$). The superscripts on the f coefficients indicate the time of the channel estimate. For example, $\underline{f}^{oT}=[f^o_1, f^o_0]$ is the estimate of the channel for the time $r_0$ is received. In this example, the first column 502 of the M matrix 500 becomes the $M_2$ matrix, the second through fourth columns 504 become the $M_1$ matrix and the fifth column 506 becomes the $M_3$ matrix. The X matrix is composed of the last Y (in this example, 1) symbols of the expected "left-hand" probe, $A_3$, the unknown data segment B (which in this case includes designations for three unknown symbols $b_0$, $b_1$ and $b_2$ to be determined) and the first Y (in this example, 1) symbols of the expected "right-hand" probe segment, $A_4$. The $A_3$ and $A_4$ probe segments are replicas, generated by the receiving apparatus, of portions of the probes expected to be transmitted in the communication sequence. In some applications the preceding and trailing probes will be congruent (each having the same sequence of symbols) while in other applications they will not be congruent (each being composed of a different sequence of symbols). Further, it will be appreciated that "Y" can be any of several different values and that the actual value used will be a function of the length of the channel response.

The channel estimate is used to construct the $M_2$ and the $M_3$ matrices, which are in turn used to subtract the ISI introduced by the probe symbols. The "precursor" and "postcursor" ISI is subtracted from the receive vector r' to form $$C=r'-M_2A_3-M_3A_4, \qquad \text{Equation 3.}$$

Using Equation 3, the least squares solutions for $\hat{B}$ can be obtained from $$C=M_1\hat{B}, \qquad \text{Equation 4.}$$

The equations lead one to determine the $\hat{B}$ that minimizes the mean-squared error (ignoring noise), $$e=(M_1\hat{B}-C)^{*T}(M_1\hat{B}-C).$$

Prior approaches, such as U.S. Pat. No. 4,365,338 to McRae et al., have obtained the least squares (LS) solution $\hat{B}$ by solving the normal equations $$(M_1^{*T}M_1)\hat{B}=M_1^{*T}C, \qquad \text{Equation 5,}$$

where the asterisk denotes the complex conjugate operator and wherein $M_1^{*T}M_1$ has dimension m×m (wherein m equals the number of transmitted symbols).

The present invention uses a different method to solve the over-determined least-squares problem. Rather than solving the normal equations, the present invention relies on QR factorization. An overview of QR factorization can be found, for example, in Section 5.3.3 of G. H. Golub and C. F. van Loan, *Matrix Computations*, $3^{rd}$. Ed., Baltimore, Johns Hopkins University Press, 1996. In the present invention, the least squares solution, $\hat{B}$, to $M_1\hat{B}=C$, is found via the QR factorization of $M_1$.

Any permutation of the rows of the $M_1$ matrix with the identical permutation of the rows of the C vector should be recognized as a mere re-ordering of the underlying arithmetic equations, and identical mathematically to the original matrix equation. Similarly, any permutation of the columns of the $M_1$ matrix with the identical permutation of the rows of the $\hat{B}$ vector should be recognized as a mere re-ordering of the terms in each of the underlying arithmetic equations, and again, identical mathematically to the original matrix equation. There may be implementation advantages, however, to applying such permutations before performing the QR factorization algorithm.

Figure 6:
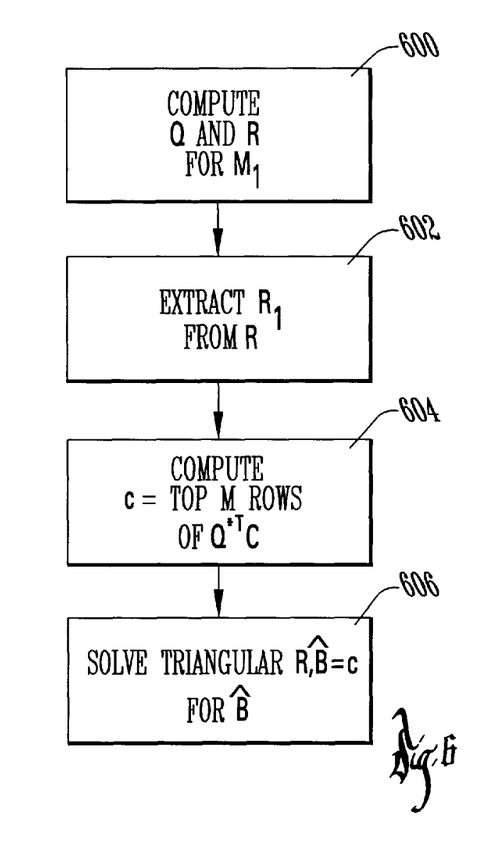
FIG. 6 is a flowchart showing steps involved in an embodiment of the present invention.

FIG. 6 outlines the steps performed in the QR factorization method of the present invention. The elements of matrices Q and R are found such that Q is unitary ($Q^{*T}=Q^{-1}$), R is upper triangular (or alternatively, as discussed herein, lower triangular), and $Q \cdot R = M_1$ 600. Since $M_1$ has dimension $(M+Y) \times M$, it follows that Q has dimension $(M+Y) \times (M+Y)$ and R has dimension $(M+Y) \times M$.

After performing the factorization, $R_1$ is extracted from R 602, where $$R = Q^{*T}M_1 = \begin{bmatrix} R_1 \\ 0 \end{bmatrix} \begin{matrix} M \text{ rows} \\ Y \text{ rows} \end{matrix}.$$

Next, c is computed 604 using $$Q^{*T}C = \begin{bmatrix} c \\ d \end{bmatrix} \begin{matrix} M \text{ coefficients} \\ Y \text{ coefficients} \end{matrix},$$

wherein $Q^{*T}C$ is a length $(M+Y)$ vector. The lower case c is used to designate the first M components, which are the components of interest here. $R_1$ is the upper square portion of R. Finally, using back substitution, the upper triangular equation, $R_1 \hat{B} = c$, is solved for $\hat{B}$ 606 to yield the least squares solution. Since $R_1$ is upper triangular, the solution is simplified. If desired, when solving the triangular matrix equation $R_1 \hat{B} = c$ 606, instead of feeding back the computed values of $\hat{b}_1$ without modification, the "decisions" based on the computed values can be fed back.

As an example, consider the 3×3 upper triangular matrix equation $Rb = C$, that is, $$\begin{bmatrix} r_{1,1} & r_{1,2} & r_{1,3} \\ 0 & r_{2,2} & r_{2,3} \\ 0 & 0 & r_{3,3} \end{bmatrix} \begin{bmatrix} b_1 \\ b_2 \\ b_3 \end{bmatrix} = \begin{bmatrix} c_1 \\ c_2 \\ c_3 \end{bmatrix}.$$

The bottom row of this matrix equation is the simple equation $r_{3,3}b_3 = c_3$, with the solution $b_3 = c_3/r_{3,3}$. The second row gives the equation $r_{2,2}b_2 + r_{2,3}b_3 = c_2$. Since $b_3$ is now known, we can solve for $b_2$. That is $b_2 = (c_2 - r_{2,3}b_3)/r_{2,2}$. Finally, the top row yields $r_{1,1}b_1 + r_{1,2}b_2 + r_{1,3}b_3 = c_1$. From this equation, we get $b_1 = (c_1 - r_{1,2}b_2 - r_{1,3}b_3)/c_3$, using the previously computed values of $b_2$ and $b_3$. This procedure can be extended to arbitrary dimension matrices. It can also be extended to lower triangular matrices, simply by starting with the top row and working down, rather than starting at the bottom and working up.

The vector b represents the transmitted symbols that we are attempting to detect. After computing the algebraic solution for each $b_i$, a "decision" of the closest symbol in the signal constellation can be made, $\hat{b}_i$, and used in the solution for all subsequent b components. In the example above, after first computing $b_3$, the closest constellation point to this value is determined, which will be denoted $\hat{b}_3$. Then, $\hat{b}_3$, rather than $b_3$, is used to solve for $b_2$. That is, $b_2 = (c_2 - r_{2,3}\hat{b}_3)/r_{2,2}$. Similarly, a decision is made on this computed value of $b_2$, denoting the closest constellation point $\hat{b}_2$. The calculation of $b_1$ uses both $\hat{b}_2$ and $\hat{b}_3$. (i.e., $b_1 = (c_1 - r_{1,2}\hat{b}_2 - r_{1,3}\hat{b}_3)/c_3$) It will be appreciated that this procedure can be extended to arbitrary dimension matrix equations and to lower triangular matrix equations.

In a related embodiment, a factorization is used wherein Q is still unitary, but R is lower triangular, such that $QR = M_1$. The performance of this type of factorization, which can be alternatively referred to as a QL factorization (wherein L designates the use lower triangular matrix), is equivalent to that of the upper triangular factorization embodiment. It will be appreciated that implementation of this embodiment just requires some changes to the indices used in the upper triangular factorization embodiment.

By way of further example, three methods for computing the QR (or a related) factorization of $M_1$ will be presented herein. The approaches presented below are based on Householder transformations, Givens rotations, and the "fast" Givens method (which avoids using square roots). These are described in detail in Chapter 5 of G. H. Golub and C. F. van Loan, *Matrix Computations*, 3$^{rd}$. Ed., Baltimore, Johns Hopkins University Press, 1996, and they can be readily modified to handle complex numbers.

It will be appreciated, however, that other methods of QR factorization also exist and can be used in the present invention. For example, other approaches to computing the QR factorization include the modified Gram-Schmidt algorithm and singular value decomposition (SVD). It is intended that embodiments using the other, undescribed methods also be considered to be within the scope of the present invention.

Complexity can be greatly reduced by exploiting the fact that the $M_1$ matrix has a regular banded structure, containing many zeros. In addition, the Q matrix need not be explicitly computed as indicated in the first step 600. Instead, the first 600 and third 604 steps of the algorithm outlined above can be combined by computing the vector $Q^{*T}C$ and solving for R at the same time.

First, the QR least squares solution using Householder transformations will be described. A Householder transformation is a square matrix H of the form $$H = I - \frac{2}{v^{*T}v} v v^{*T}$$

for some vector v, where I is the identity matrix. If v is carefully chosen, it can be arranged that, for some vector x, Hx is zero in all but the first coordinate. The v that achieves this goal has its first coordinate as $$v_1 = x_1 \pm \frac{x_1}{|x_1|} \sqrt{x^{*T}x},$$

while the rest of its components are given by $$v_i = x_i, i \neq 1.$$

By choosing the x vector appropriately, a QR factorization can be computed as a series of Householder transformations. A MATLAB m-file that uses Householder transformations to compute R and $Q^{*T}C$ is shown below. It does not rely on any black-box MATLAB functions (although it does use the '\' operator to perform back substitution, since this will be quicker than using 'for' loops). The variables A and b correspond to $M_1$ and C, respectively. The structure of the $M_1$ matrix (specifically its known regions of zero components) is exploited to greatly reduce the computational burden. The variable R corresponds to the matrix of the same name, and $Q^{*T}C$ is accumulated in the variable, b1. The variable taps is the length of the channel estimate, Y+1.

The following is an example of a MATLAB m-file using Householder transformations:

```
function x=housels_bandsp2(A,b,taps);
%householder LS Solution to overdetermined Ax=b
%lower bw=taps-1,upper bw=0
%#rows=#cols+taps-1

% A corresponds to M1, b to C, b1 to Q*TC, R to R, x to
    bhat=LS soln.
```

```
[m,n]=size(A);

b1=b;
for j=1:n
    x=A(j:j+L,j);
    x1u=x(1)/abs(x(1)); %unit vector in direction of x(1)
    v1=x(1)+x1u*sqrt(x'*x);
    v=[1;x(2:L+1)/v1];
    beta=2/(v'*v);
    vvp=v(1:L+1)*v(1:L+1)';
    A(j:j+L,j:min(j+L,n))=(eye(L+1)-beta*vvp)*A(j:j+L,
        j:min(j+L,n));
    b1(j:j+L)=(eye(L+1)-beta*vvp)*b1(j:j+L);
end R=triu(A); %ensure no finite precision effects prevent
    triangularity
x=R(1:n,1:n)\b1(1:n); %back subst.—C code can take
    advantage of zeros return
```

The above function returns the linear least squares solution. The following code fragment implements decision feedback in the back-substitution step.

```
%block DFE "trick" in backsubstitution
xhat=zeros(n,1);
for j=n:-1:1
    newx=(b1(j)-R(j,:)*xhat)/R(j,j);
    xhat(j)=slicer(newx,constellation);
end
x=xhat;
```

This code fragment calls the function "slicer", which returns the nearest point in the constellation of possible transmitted symbols. The set of all possible transmitted symbols is stored in the vector "constellation."

```
function [value]=slicer(in,constellation)
% arbitrary slicer [value]=slicer(in,constellation)
% returns nearest value in constellation vector
[C,index]=min(abs(constellation-in));
value=constellation(index);
```

Next, a QR least squares solution using Givens rotations will be described. A Givens rotation differs from a Householder transformation, in that it zeros one coordinate of a vector, rather than all but the first. Thus, the QR factorization requires more Givens rotations than Householder reflections. Since the present application involves a sparse matrix, however, Givens rotations may be more efficient.

A Givens rotation is a matrix that differs from the identity matrix in four coordinates:

$$G(i, k, \theta) = \begin{bmatrix} 1 & & & & & & 0 \\ & \ddots & & & & & \\ & & c & \cdots & s & & \\ & & \vdots & \ddots & \vdots & & \\ & & -s & \cdots & c & & \\ & & & & & \ddots & \\ 0 & & & & & & 1 \end{bmatrix} \begin{matrix} \\ \\ i \\ \\ k \\ \\ \end{matrix}$$
$$\phantom{G(i, k, \theta) = \begin{bmatrix} 1 \end{bmatrix}} i \phantom{\cdots} k$$

By appropriate choices of (real) c and (complex) s values, it can be ensured that component, $y_k$, of $y=G^{*T}x$ is zero. Specifically, $$y_j = \begin{cases} cx_i - sx_k & j = i \\ sx_i + cx_k & j = k \\ x_j & j \neq i, k \end{cases}$$

is obtained $y_k$ can be forced to zero by setting $$c = \frac{x_i}{(1 \angle x_i)\sqrt{x_i^2 + x_k^2}} \text{ and } s = \frac{-x_k}{(1 \angle x_i)\sqrt{x_i^2 + x_k^2}}.$$

Given inputs $x_i$ (variable x1) and $x_k$ (variable x2), the following MATLAB function computes c and s.

```
function [c,s]=givens_c(x1,x2)
% compute c and s for a complex Givens rotation if (x2==0)
    c=1;
    s=0;
else
    den=sqrt(x1'*x1+x2'*x2);
    angle_corr=conj(x1/abs(x1)); %rotation to force c to
        be real
    c=x1*angle_corr/den;
    s=-x2*angle_corr/den;
end
return
```

A series of Given rotations can also be used to compute the QR factorization of a matrix. The MATLAB function presented below, which calls the above function to compute individual c's and s's, uses such a series. As with Householder transforms, $Q^{*T}C$ is computed instead of Q. Again, the banded structure of the $M_1$ matrix is used to greatly reduce the computational burden. The variables A and b correspond to $M_1$ and C, respectively. The variable R corresponds to the matrix of the same name, and $Q^{*T}C$ is accumulated in the variable qb2.

The following MATLAB function implements the aspects discussed above:

```
function x=givensls_bandsp_fact(A,b,taps);
%Givens LS Solution to overdetermined Ax=b
%lower bw=taps-1,upper bw=0
%#rows=#cols+taps-1

L=taps-1;
[m,n]=size(A);
%use Givens algorithm for qr decomp qb2=b;
for j=1:n
    for i=j+L:-1:j+1
        [c,s]=givens_c(A(i-1,j),A(i,j));
        A(i-1:i,j:min(j+L,n))=[c s';-s c]*A(i-1:i,j:min(j+L,
            n));
        qb2(i-1:i)=[c s';-s c]*qb2(i-1:i); %compute q'*b as
            method proceeds
    end
end
r=triu(A);
```

```
R1=r(1:n,1:n);  %already have R1, should already be
    upper triangular
c=qb2(1:n); %pick off top part
%d=qb1(M+1:M+L); %don't need d
x=R1\c; %R1 is upper triangular
%C code can take advantage of zeros in R1
return
```

Fast Givens rotations can be used to compute a factorization of a matrix A consisting of a nonsingular matrix M, a diagonal matrix D with real positive values along its diagonal, and an upper triangular matrix T, with the properties $M^{*T}A=T$ and $M^{*T}M=D$. This MTD factorization is related to the QR factorization by $Q=MD^{-\frac{1}{2}}$ and $R=D^{1/2}T$. Fast Givens rotations are called "fast" because they do not involve square roots. Otherwise, the complexity is on the same order as the normal Givens algorithm.

The function below computes the parameters used for the fast Givens rotations (analogous to c and s for a standard Givens rotation).

```
function [alpha,beta,gamma,type]=fastgivens_c(x,d)
% fast givens rotations for complex x, real d if(x(2)~=0)
    alpha=-(x(1)/x(2))';
    beta=-alpha'*d(2)/d(1);
    gamma=-alpha'*beta';
    if (gamma<=1)
        type=1;
        tau=d(1);
        d(1)=(1+gamma)*d(2);
        d(2)=(1+gamma)*tau;
    else
        type=2;
        alpha=1/alpha;
        beta=1/beta;
        gamma=1/gamma;
        d(1)=(1+gamma)*d(1);
        d(2)=(1+gamma)*d(2);
    end
else
    type=2;
    alpha=0;
    beta=0;
    gamma=0;
end
return
```

The function below computes the MTD factorization of the $M_1$ matrix using fast Givens transforms. The variable A contains $M_1$ on entry and T on exit from the routine. The variable L is the number of channel taps minus 1.

```
function [M,A,d]=fastgivensqr_bandsp(A,L)
%fast Givens M(D^-1)T factorization
%for a banded matrix, upper bandwidth=0; lower
    bandwidth=L
%#rows=#cols+L

[m,n]=size(A);
for(k=1:m)
    d(k)=1;
end
M=eye(m);
for(j=1:n)
    for(k=j+L:-1:j+1)
        old_d=d(k-1:k);
        [alpha,beta,gamma,type]=fastgivens_c(A(k-1:k,j),
            old_d);

if (type==1)
            A(k-1:k,j:min(n,j+L))=[beta 1;1 alpha]*A(k-
                1:k,j:min(n,j+L));
            M(k-1:k,1:j+L)=[beta 1;1 alpha]*M(k-1:k,1:j+
                L);
            d(k-1)=old_d(2)*(1+gamma);
            d(k)=old _d(1)*(1+gamma);
        else
            A(k-1:k,j:min(n,j+L))=[1 alpha;beta 1]*A(k-
                1:k,j:min(n,j+L));
            M(k-1:k,1:j+L)=[1 alpha;beta 1]*M(k-1:k,1:j+
                L);
            d(k-1)=old_d(1)*(1+gamma);
            d(k)=old_d(2)*(1+gamma);
        end
    end
end
M=M';
return;
```

A code fragment using this function to compute the least squares solution is listed below. As with the earlier methods, a more efficient implementation would compute $M^{*T}C$, rather than M. For example, a method can be used that has the same updates as for M in the routine above, that starts with C instead of I, and that does not transpose at the end.

```
[Mm,T,dv]=fastgivensqr_bandsp(M1_est,L);
S1=T(1:M,1:M);
Mtb=Mm'*C;
c=Mtb(1:M);
Bhat=S1\c; %back substitution
```

As with the other functions presented herein, the code can be modified to be more memory efficient.

Any of the equalizers discussed above can alternatively be a T/k-fractionally-spaced equalizer taking more than one sample per transmitted symbol interval (where "k" indicates the number of samples taken per transmitted symbol, and "T" indicates the duration of one symbol interval). In this case, the channel is also estimated to a time resolution of T/k, using one of several well-known techniques.

Figure 7:
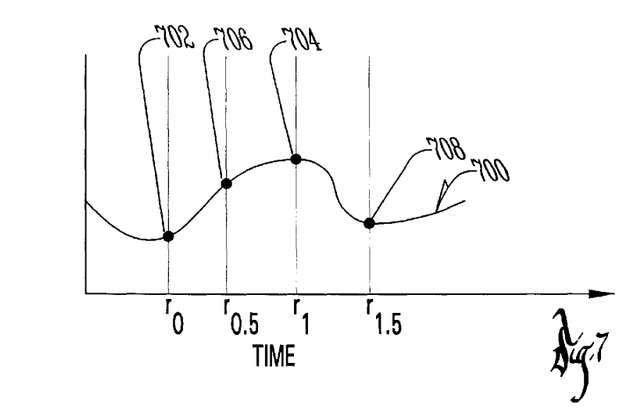
FIG. 7 depicts an embodiment using a T/2 spaced fractional sampling scheme.

FIG. 7 depicts the sampling of a portion of a received signal 700 performed in an embodiment using a T/2 spaced fractional sampling scheme. The first sample taken of each transmitted symbol is represented by $r_0$ 702, $r_1$ 704, etc., and the second sample taken of each transmitted symbol is represented as $r_{0.5}$ 706, $r_{1.5}$ 708, etc. (The subscript indicates the number of symbol intervals, T, from the first sample, $r_0$.) Analogously, the T/2 spaced channel impulse response estimate may be separated into the first sample per symbol period and the second sample per symbol period.

Figure 8:
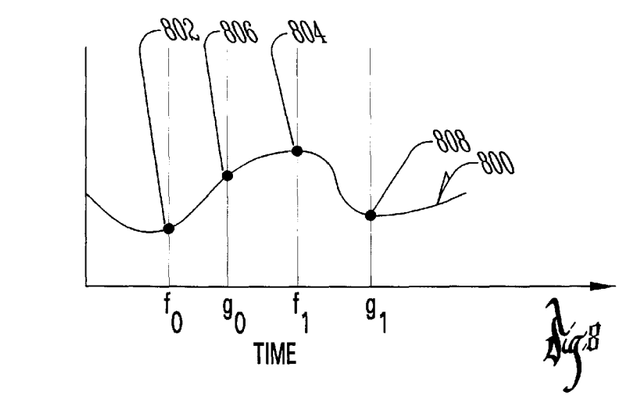
FIG. 8 depicts a channel impulse response estimate with a time resolution of T/2.

FIG. 8 depicts a channel impulse response estimate with a time resolution of T/2. The first coefficient of the channel impulse response in a symbol interval is represented by $f_0$ 802, $f_1$ 804, etc., and the second coefficient of the channel impulse response in a symbol interval is represented as $g_0$ 806, $g_1$ 808, etc., where the subscripts indicate the symbol interval.

Figure 9:
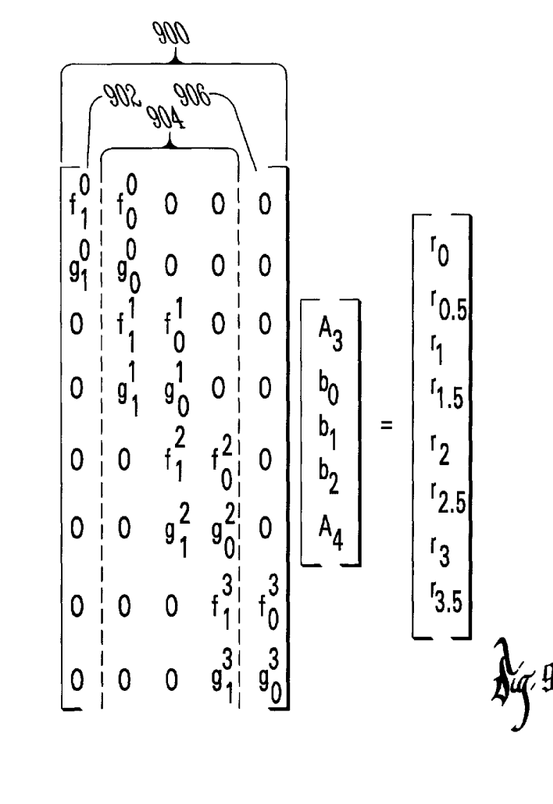
FIG. 9 depicts a representation of a matrix for use with a T/2 spaced fractional sampling scheme.

FIG. 9 depicts a representation of an M matrix 900 for the T/2 spaced fractional sampling scheme where the length of the channel impulse response is two symbol intervals. This is the set of convolution equations expressed in matrix form. The first column 902 of the M matrix 900 becomes the $M_2$ matrix, the second through fourth columns 904 become the $M_1$ matrix and the fifth column 906 becomes the $M_3$ matrix in the equations presented above.

The $M_1$ matrix is thus modified by interlacing the channel estimates for the first sampling time (f) and the channel estimates for the second sampling time (g). (If more than two samples per symbol (k) are taken, then the channel estimates for these sampling times are interlaced as well.) The r' vector is modified to include all T/2 spaced samples of the received signal. As in the above-described embodiments, the probe induced ISI is calculated using the $M_2$ and $M_3$ matrices and subtracted from r' to yield C. The remainder of the approach proceeds exactly as above, only using the new $M_1$, $M_2$, and $M_3$ matrices and the new r' (and hence C) vectors.

Figure 10:
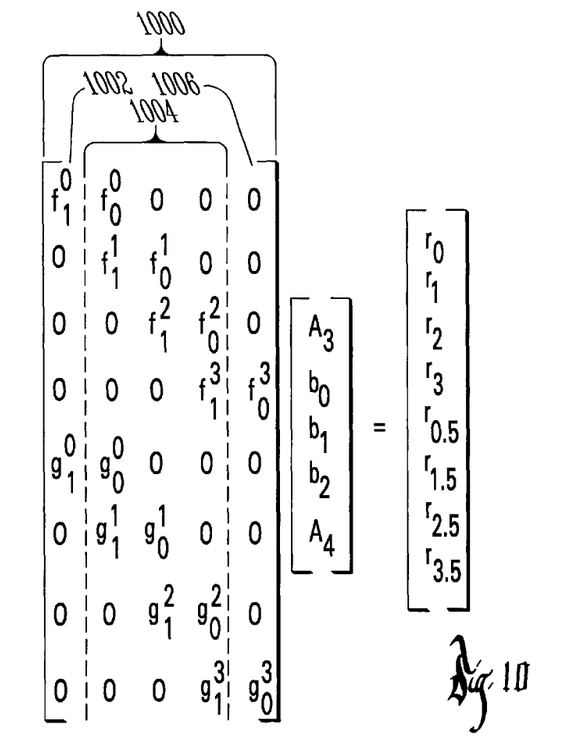
FIG. 10 depicts another representation of a matrix for use with a T/2 spaced fractional sampling scheme.

Further, implementation advantages may be obtained by de-interlacing the columns of M and of r' by grouping the rows associated with each sampling time within the symbol interval. For example, the convolution matrix equation represented in FIG. 9 would become the matrix equation of FIG. 10. FIG. 10 depicts a representation of an M matrix 1000 for the T/2 spaced fractional sampling scheme. The first column 1002 of the M matrix 1000 becomes the $M_2$ matrix, the second through fourth columns 1004 become the $M_1$ matrix and the fifth column 1006 is again the $M_3$ matrix Since each row of the M matrix and the associated row of the r' vector represent one arithmetic equation, this rearrangement is merely a reordering of the equations.

As with the T-spaced equalizer, permuting the rows of the $M_1$ matrix and the rows of the C vector results in a new matrix equation mathematically identical to the original. Also, permuting the columns of the $M_1$ matrix and the rows of the B̂ vector results in a new matrix equation mathematically identical to the original. Such permutations may simplify the implementation of the QR factorization algorithm.

Further, the present invention can be used in conjunction with an approach wherein changing channel characteristics occurring over the duration of the data block are taken into account. Such an approach is disclosed in a U.S. patent application by Joseph T. Graf and Thomas L. Tapp, filed on even date herewith, and entitled "Block Decision Directed Equalization Method and Apparatus." The entire specification, including any and all drawing figures and appendices, of the U.S. patent application by Joseph T. Graf and Thomas L. Tapp, filed on even date herewith, and entitled "Block Decision Directed Equalization Method and Apparatus", is hereby incorporated herein by this reference.

By way of further example, a back substitution approach can be applied to the present invention in conjunction with the teachings of the incorporated patent application. In this embodiment, both upper and lower triangular solutions can be used at the same time. For example, a lower triangular back substitution can proceed from one of the known probe segments to some mid-point of the unknown data segment as an upper triangular back substitution proceeds from the other known probe segment to the same point. Although this approach requires that two QR factorizations be performed, it can still result in overall improved performance. The upper and lower triangular approach can be beneficial, for example, in circumstances where burst noise can corrupt symbols adjacent one side of the unknown data segment and thereby corrupt the channel estimate that is derived for the solution from that side. For instance, when the right-hand decision vector has been corrupted, the symbol decisions proximate to the right-hand side can be based on the solution that is proceeding from the left.

Further, a QR or combined QR and QR factorization can be applied in an iterative approach. For example, a QR factorization can be used to solve for one or several of the transmitted symbols at one end of a data block. These detected symbols can be used to update the channel impulse response, by, for example, the LMS algorithm. These detected symbols can then be treated as part of the known data ("probe"), and the process is repeated with a now shorter unknown data block.

Similarly, a QR factorization can be used to solve for one or several of the transmitted symbols at one end of a data block, and a QL factorization can be used to solve for one or several of the transmitted symbols at the other end of a data block. These detected symbols can be used to update the channel impulse response, by, for example, the LMS algorithm. These detected symbols can then be treated as part of the known data ("probe"), and the process is repeated with a now shorter unknown data block. While these iterative approaches involve several QR or QL factorizations, they provide better estimates of the channel impulse response within the block of unknown data.

It is thought that the present invention will be understood from the description provided throughout this specification and the appended claims, and that it will be apparent that various changes may be made in the form, construct steps and arrangement of the parts and steps thereof, without departing from the spirit and scope of the invention or sacrificing all of their material advantages. The forms herein described are merely exemplary embodiments thereof.

What is claimed is:

1. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica; and performing a QR factorization, using the estimation of the channel characteristics existing at the time of transmission of the first known data segment and the estimation of the channel characteristics existing at the time of transmission of the second known data segment and the received signal, to determine the symbols of the unknown data segment, wherein said performing step comprises the steps of, computing the Q and R matrices for determining $M_1$, wherein Q is a unitary matrix, R is an upper triangular matrix, and $Q \cdot R = M_1$;

extracting the $R_1$ matrix from the R matrix, wherein $R_1$ is the top M rows of R, and wherein M represents the number of unknown data symbols in the unknown data segment;

determining the c matrix, wherein c is the top M rows of $Q^{*T}C$, wherein C is the received signal related to the unknown data segment with intersymbol interference induced by the known data segments removed; and solving $R_1\hat{B}=c$, for $\hat{B}$, using back substitution, wherein $\hat{B}$ is a vector representing the symbols of the unknown data segment.

2. The method of claim 1, wherein said step of performing a QR factorization comprises the step of using a Householder transformation to accomplish the factorization.

3. The method of claim 1, wherein said step of performing a QR factorization comprises the step of using a Givens rotation to accomplish the factorization.

4. The method of claim 1, wherein said step of performing a QR factorization comprises the step of using a fast Givens rotation to accomplish the factorization.

5. The method of claim 1, wherein said performing step comprises the step of using back substitution when determining the symbols of the unknown data segment.

6. The method of claim 1, wherein said receiving step uses a fractionally spaced sampling technique.

7. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica; and performing a QR factorization, using the estimation of the channel characteristics existing at the time of transmission of the first known data segment and the estimation of the channel characteristics existing at the time of transmission of the second known data segment and the received signal, to determine the symbols of the unknown data segment, wherein said performing step comprises the steps of, computing the Q and R matrices for determining $M_1$, wherein Q is a unitary matrix, R is a lower triangular matrix, and $Q \cdot R = M_1$;

extracting the $R_1$ matrix from the R matrix, wherein $R_1$ is the bottom M rows of R, and wherein M represents the number of unknown data symbols in the unknown data segment;

determining the c matrix, wherein c is the bottom M rows of $Q^{*T}C$, and wherein C is the received signal related to the unknown data segment with intersymbol interference induced by the known data segments removed; and solving $R_1\hat{B}=c$, for $\hat{B}$, using back substitution, wherein $\hat{B}$ is a vector representing the symbols of the unknown data segment.

8. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica; and performing a QR factorization, using the estimation of the channel characteristics existing at the time of transmission of the first known data segment and the estimation of the channel characteristics existing at the time of transmission of the second known data segment and the received signal, to determine the symbols of the unknown data segment, wherein said performing step comprises the steps of, computing the $Q^{*T}C$ and R matrices related to $M_1$, wherein Q is a unitary matrix, R is an upper triangular matrix, and $Q \cdot R = M_1$, and determining the c matrix, wherein c is the top M rows of $Q^{*T}C$, wherein C is the received signal related to the unknown data segment with intersymbol interference induced by the known data segments removed;

extracting the $R_1$ matrix from the R matrix, wherein $R_1$ is the top M rows of R, and wherein M represents the number of unknown data symbols in the unknown data segment; and solving $R_1\hat{B}=c$, for $\hat{B}$, using back substitution, wherein $\hat{B}$ is a vector representing the symbols of the unknown data segment.

9. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica; and performing a QR factorization, using the estimation of the channel characteristics existing at the time of transmission of the first known data segment and the estimation of the channel characteristics existing at the time of transmission of the second known data segment and the received signal, to determine the symbols of the unknown data segment, wherein said performing step comprises the steps of, computing the $Q^{*T}C$ and R matrices related to $M_1$, wherein Q is a unitary matrix, R is a lower triangular matrix, and $Q \cdot R = M_1$, and determining the c matrix, wherein c is the bottom M rows of $Q^{*T}C$, wherein C is the received signal related to the unknown data segment with intersymbol interference induced by the known data segments removed;

extracting the $R_1$ matrix from the R matrix, wherein $R_1$ is the bottom M rows of R, and wherein M represents the number of unknown data symbols in the unknown data segment; and solving $R_1 \hat{B} = c$, for $\hat{B}$, using back substitution, wherein $\hat{B}$ is a vector representing the symbols of the unknown data segment.

10. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica;

performing a QR factorization, using the estimation of the channel characteristics existing at the time of transmission of the first known data segment and the estimation of the channel characteristics existing at the time of transmission of the second known data segment and the received signal, to determine the symbols of the unknown data segment;

wherein said performing step further comprises the step of using back substitution when determining the symbols of the unknown data segment; and wherein said step of using back substitution feeds back decisions based on the actually determined values of the symbols of the unknown data segment.

11. A method of receiving data transmitted via a dispersive media, comprising the steps of:

receiving, by a receiver apparatus, a signal communicated through a dispersive media, the signal comprising an unknown data segment that is preceded by a first known data segment and followed by a second known data segment;

generating a replica of the first known data segment and the second known data segment;

estimating channel characteristics existing at the time of transmission of the first known data segment by comparing the received first known data segment with its generated replica;

estimating channel characteristics existing at the time of transmission of the second known data segment by comparing the received second known data segment with its generated replica;

performing a QR factorization, using the estimation of the channel characteristics existing at the time of transmission of the first known data segment and the estimation of the channel characteristics existing at the time of transmission of the second known data segment and the received signal, to determine the symbols of the unknown data segment; and wherein said performing step includes the step of taking changing channel characteristics into account in determining the symbols of the unknown data segment.

12. The method of claim 11, wherein said taking step further comprises the step of updating the estimation of the channel characteristics existing at the time of transmission of the first known data segment and the estimation of the channel characteristics existing at the time of transmission of the second known data segment, said updating step being performed at least once during the determination of the signals of the unknown data segment.

13. The method of claim 11, wherein said taking step comprises the step of using the estimation of the channel characteristics existing at the time of transmission of the first known data segment to estimate at least one symbol of the unknown data segment and using the estimation of the channel characteristics existing at the time of transmission of the second known data segment to estimate at least one symbol of the unknown data segment.

14. A communication apparatus to receive an unknown data segment, comprising:

a signal receiving component capable of receiving a signal communicated via a dispersive media, the signal comprising an unknown data segment that is preceded by a first known data segment and followed by a second known data segment;

a known signal replicating component capable of generating a replica of the first known data segment and the second known data segment;

a memory system storing data representing the unknown data segment, the first known data segment and the second known data segment, said memory system also storing instructions for estimating channel characteristics existing at the time of transmission of the first known data segment, storing instructions for estimating channel characteristics existing at the time of transmission of the second known data segment, and also storing instructions for performing a QR factorization, using the estimation of the channel characteristics existing at the time of transmission of the first known data segment and the estimation of the channel characteristics existing at the time of transmission of the second known data segment and the received signal, to determine the symbols of the unknown data segment;

a processing component, coupled with said signal receiving component, with said known signal replicating component and also coupled with said memory system, said processing component being capable of executing the instructions for estimating channel characteristics existing at the time of transmission of the first known data segment, being capable of executing the instructions for estimating channel characteristics existing at the time of transmission of the second known data segment, and also being capable of executing the instructions for performing a QR factorization to determine the symbols of the unknown data segment;

wherein said memory system also stores instructions for using back substitution when determining the symbols of the unknown data segment, and wherein said processing component is capable of executing the instructions for using back substitution when determining the symbols of the unknown data segment; and wherein said memory system also stores instructions for feeding back decisions based on the actually determined values of the symbols of the unknown data segment, and wherein said processing component is capable of executing the instructions for feeding back decisions based on the actually determined values of the symbols of the unknown data segment.

15. A communication apparatus capable of receiving a signal via a dispersive media, comprising:

means for receiving a signal communicated via a dispersive media, the signal comprising an unknown data segment that is preceded by a first known data segment and followed by a second known data segment;

means for replicating the first known data segment and the second known data segment;

means for storing information representing the unknown data segment, the first known data segment and the second known data segment, said means for storing information also being for storing instructions for estimating channel characteristics existing at the time of transmission of the first known data segment, for storing instructions for estimating channel characteristics existing at the time of transmission of the second known data segment, and also for storing instructions for performing a QR factorization, using the estimation of the channel characteristics existing at the time of transmission of the first known data segment and the estimation of the channel characteristics existing at the time of transmission of the second known data segment and the received signal, to determine the symbols of the unknown data segment;

means for processing, coupled with said means for receiving, with said means for replicating and also coupled with said means for storing, said means for processing being capable of executing the instructions for estimating channel characteristics existing at the time of transmission of the first known data segment, of executing the instructions for estimating channel characteristics existing at the time of transmission of the second known data segment, and also being capable of executing the instructions for performing a QR factorization to determine the symbols of the unknown data segment; and wherein the instructions for performing a QR factorization include instructions for computing the Q and R matrices for determining $M_1$ where Q is a unitary matrix, R is a triangular matrix, and $Q \cdot R = M_1$, and wherein said means for processing is capable of executing the instructions for computing the Q and R matrices for determining $M_1$ where Q is a unitary matrix, R is a triangular matrix, and $Q \cdot R = M_1$.

16. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal, wherein said performing step comprises the steps of, computing the Q and R matrices for determining $M_1$, wherein Q is a unitary matrix, R is an upper triangular matrix, and $Q \cdot R = M_1$;

extracting the $R_1$ matrix from the R matrix, wherein $R_1$ is the top M rows of R, and wherein M represents the number of unknown data symbols in the unknown data segment;

determining the c matrix, wherein c is the top M rows of $Q^{*T}C$, wherein C is the received signal related to the unknown data segment with intersymbol interference induced by the known data segments removed; and solving $R_1 \hat{B} = c$, for $\hat{B}$, using back substitution, wherein $\hat{B}$ is a vector representing the symbols of the unknown data segment.

17. The method of claim 16, wherein said step of performing a QR factorization comprises the step of using a Givens rotation to accomplish the factorization.

18. The method of claim 16, wherein said step of performing a QR factorization comprises the step of using a fast Givens rotation to accomplish the factorization.

19. The method of claim 16, wherein said performing step comprises the step of using back substitution when determining the symbols of the unknown data segment.

20. The method of claim 16, wherein said receiving step uses a fractionally spaced sampling technique.

21. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal, wherein said performing step comprises the steps of, computing the Q and R matrices for determining $M_1$, wherein Q is a unitary matrix, R is a lower triangular matrix, and $Q \cdot R = M_1$;

extracting the $R_1$ matrix from the R matrix, wherein $R_1$ is the bottom M rows of R, and wherein M represents the number of unknown data symbols in the unknown data segment;

determining the c matrix, wherein c is the bottom M rows of $Q^{*T}C$, and wherein C is the received signal related to the unknown data segment with intersymbol interference induced by the known data segments removed; and solving $R_1 \hat{B} = c$, for $\hat{B}$, using back substitution, wherein $\hat{B}$ is a vector representing the symbols of the unknown data segment.

22. The method of claim 21, wherein said step of performing a QR factorization comprises the step of using a Givens rotation to accomplish the factorization.

23. The method of claim 21, wherein said step of performing a QR factorization comprises the step of using a fast Givens rotation to accomplish the factorization.

24. The method of claim 21, wherein said performing step comprises the step of using back substitution when determining the symbols of the unknown data segment.

25. The method of claim 21, wherein said receiving step uses a fractionally spaced sampling technique.

26. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal, wherein said performing step comprises the steps of, computing the $Q^{*T}C$ and R matrices related to $M_1$, wherein Q is a unitary matrix, R is an upper triangular matrix, and $Q \cdot R = M_1$, and determining the c matrix, wherein c is the top M rows of $Q^{*T}C$, wherein C is the received signal related to the unknown data segment with intersymbol interference induced by the known data segments removed;

extracting the $R_1$ matrix from the R matrix, wherein $R_1$ is the top M rows of R, and wherein M represents the number of unknown data symbols in the unknown data segment; and solving $R_1\hat{B}=c$, for $\hat{B}$, using back substitution, wherein $\hat{B}$ is a vector representing the symbols of the unknown data segment.

27. The method of claim 26, wherein said step of performing a QR factorization comprises the step of using a Givens rotation to accomplish the factorization.

28. The method of claim 26, wherein said step of performing a QR factorization comprises the step of using a fast Givens rotation to accomplish the factorization.

29. The method of claim 26, wherein said performing step comprises the step of using back substitution when determining the symbols of the unknown data segment.

30. The method of claim 26, wherein said receiving step uses a fractionally spaced sampling technique.

31. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal, wherein said performing step comprises the steps of, computing the $Q^{*T}C$ and R matrices related to $M_1$, wherein Q is a unitary matrix, R is a lower triangular matrix, and $Q \cdot R = M_1$, and determining the c matrix, wherein c is the bottom M rows of $Q^{*T}C$, wherein C is the received signal related to the unknown data segment with intersymbol interference induced by the known data segments removed;

extracting the $R_1$ matrix from the R matrix, wherein $R_1$ is the bottom M rows of R, and wherein M represents the number of unknown data symbols in the unknown data segment; and solving $R_1\hat{B}=c$, for $\hat{B}$, using back substitution, wherein $\hat{B}$ is a vector representing the symbols of the unknown data segment.

32. The method of claim 31, wherein said step of performing a QR factorization comprises the step of using a Givens rotation to accomplish the factorization.

33. The method of claim 31, wherein said step of performing a QR factorization comprises the step of using a fast Givens rotation to accomplish the factorization.

34. The method of claim 31, wherein said performing step comprises the step of using back substitution when determining the symbols of the unknown data segment.

35. The method of claim 31, wherein said receiving step uses a fractionally spaced sampling technique.

36. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal;

using back substitution, during said step of performing a QR factorization, when determining the symbols of the unknown data segment; and feeding back decisions, during said step of using back substitution, based on the actually determined values of the symbols of the unknown data segment.

37. The method of claim 36, wherein said step of performing a QR factorization comprises the step of using a Givens rotation to accomplish the factorization.

38. The method of claim 36, wherein said step of performing a QR factorization comprises the step of using a fast Givens rotation to accomplish the factorization.

39. The method of claim 36, wherein said performing step comprises the step of using back substitution when determining the symbols of the unknown data segment.

40. The method of claim 36, wherein said receiving step uses a fractionally spaced sampling technique.

41. A method of determining an unknown data segment transmitted via a dispersive media, the unknown data segment being preceded by a first known data segment and followed by a second known data segment, comprising the steps of:

performing a QR factorization, using an estimation of the channel characteristics existing at the time of transmission of the first known data segment and an estimation of the channel characteristics existing at the time of transmission of the second known data segment and the received signal; and taking, during said step of performing a QR factorization, changing channel characteristics into account in determining the symbols of the unknown data segment.

42. A communication apparatus to receive an unknown data segment, comprising:

a signal receiving component capable of receiving a signal communicated via a dispersive media, the signal comprising an unknown data segment that is preceded by a first known data segment and followed by a second known data segment;

a known signal replicating component capable of generating a replica of the first known data segment and the second known data segment;

a memory system storing data representing the unknown data segment, the first known data segment and the second known data segment, said memory system also storing instructions for estimating channel characteristics existing at the time of transmission of the first known data segment, storing instructions for estimating channel characteristics existing at the time of transmission of the second known data segment, and also storing instructions for performing a QR factorization, using the estimation of the channel characteristics existing at the time of transmission of the first known data segment and the estimation of the channel characteristics existing at the time of transmission of the second known data segment and the received signal, to determine the symbols of the unknown data segment;

a processing component, coupled with said signal receiving component, with said known signal replicating component and also coupled with said memory system, said processing component being capable of executing the instructions for estimating channel characteristics existing at the time of transmission of the first known data segment, being capable of executing the instructions for estimating channel characteristics existing at the time of transmission of the second known data segment, and also being capable of executing the instructions for performing a QR factorization to determine the symbols of the unknown data segment; and wherein said memory system also stores instructions for taking changing channel characteristics into account in determining the symbols of the unknown data segment, and wherein said processing component is capable of executing the instructions for taking changing channel characteristics into account in determining the symbols of the unknown data segment.

43. A communication apparatus to receive an unknown data segment, comprising:

a signal receiving component capable of receiving a signal communicated via a dispersive media, the signal comprising an unknown data segment that is preceded by a first known data segment and followed by a second known data segment;

a known signal replicating component capable of generating a replica of the first known data segment and the second known data segment;

a memory system storing data representing the unknown data segment, the first known data segment and the second known data segment, said memory system also storing instructions for estimating channel characteristics existing at the time of transmission of the first known data segment, storing instructions for estimating channel characteristics existing at the time of transmission of the second known data segment, and also storing instructions for performing a QR factorization, using the estimation of the channel characteristics existing at the time of transmission of the first known data segment and the estimation of the channel characteristics existing at the time of transmission of the second known data segment and the received signal, to determine the symbols of the unknown data segment;

a processing component, coupled with said signal receiving component, with said known signal replicating component and also coupled with said memory system, said processing component being capable of executing the instructions for estimating channel characteristics existing at the time of transmission of the first known data segment, being capable of executing the instructions for estimating channel characteristics existing at the time of transmission of the second known data segment, and also being capable of executing the instructions for performing a QR factorization to determine the symbols of the unknown data segment;

wherein said memory system also stores instructions for computing the Q and R matrices for determining $M_1$, wherein Q is a unitary matrix, R is an upper triangular matrix, and $Q \cdot R = M_1$, for extracting the $R_1$ matrix from the R matrix, wherein $R_1$ is the top M rows of R, and wherein M represents the number of unknown data symbols in the unknown data segment, for determining the c matrix, wherein c is the top M rows of $Q^{*T}C$, wherein C is the received signal related to the unknown data segment with intersymbol interference induced by the known data segments removed, and for solving $R_1 \hat{B} = c$, for $\hat{B}$, using back substitution, wherein $\hat{B}$ is a vector representing the symbols of the unknown data segment; and wherein said processing component is capable of executing the instructions for computing the Q and R matrices for determining $M_1$, for extracting the $R_1$ matrix from the R matrix, for determining the c matrix, and for solving $R_1 \hat{B} = c$, for $\hat{B}$, using back substitution.

* * * * *